(12) United States Patent
Wagner et al.

(10) Patent No.: US 6,456,675 B2
(45) Date of Patent: Sep. 24, 2002

(54) DIVERSITY RECEPTION EMPLOYING PERIODIC TESTING

(75) Inventors: Keely Anne Wagner, Neenah; Brian John Melewski, Appleton; Timothy Patrick Murphy, Menasha; Daniel Thomas Sullivan, New London; Todd Robert Thyes, Appleton; Gregory W. Burneske, Sherwood, all of WI (US)

(73) Assignee: Memorylink Corporation, Neenah, WI (US)

( * ) Notice: Subject to any disclaimer, the term of this patent is extended or adjusted under 35 U.S.C. 154(b) by 0 days.

(21) Appl. No.: 09/777,338

(22) Filed: Feb. 6, 2001

Related U.S. Application Data (60) Provisional application No. 60/199,712, filed on Apr. 26, 2000.

(51) Int. Cl.[7] ................................. H04B 7/10
(52) U.S. Cl. ............... 375/347; 375/224; 455/135
(58) Field of Search ................... 375/347, 224, 375/267; 455/135, 277.1, 277.2

(56) References Cited

U.S. PATENT DOCUMENTS

| | | | |
|---|---|---|---|
| 5,325,403 A | * | 6/1994 | Siwiak et al. ............... 375/347 |
| 5,530,926 A | * | 6/1996 | Rozanski ................. 455/277.2 |
| 5,952,963 A | * | 9/1999 | Shen et al. ................. 342/367 |
| 6,185,266 B1 | * | 2/2001 | Kuchi et al. ................ 375/347 |

FOREIGN PATENT DOCUMENTS

GB 2272604 * 5/1994

* cited by examiner

Primary Examiner—Temesghen Ghebretinsae
(74) Attorney, Agent, or Firm—Banner & Witcoff, Ltd.

(57) ABSTRACT

The quality of a channel for each of a plurality of receive antennas is determined in part by examining data collected during reception of test data. Substantially simultaneously, payload data is also used to evaluate channel quality for at least one antenna. A quality metric calculated for any given antenna is the result of measurements made upon the test and payload data. Parameters used to calculate the quality metric are preferably divided into two sets of non-identical parameters, those based on the test data and those based on the payload data. These parameters preferably include jitter, received signal strength, CRC errors and synchronization errors. By continuously updating quality metrics based on both test and payload data, more reliable assessments can be made of the various antennas being used. As a result, antenna selection is rendered commensurately more reliable thereby improving received signal quality.

57 Claims, 6 Drawing Sheets

DIVERSITY RECEPTION EMPLOYING PERIODIC TESTING

CROSS-REFERENCE TO RELATED APPLICATION

The instant application claims priority under 35 U.S.C. §119(e) from U.S. Provisional Patent Application Ser. No. 60/199,712 filed on Apr. 26, 2000.

TECHNICAL FIELD

The present invention relates generally to wireless communication systems and, in particular, to the selection of receiving antennas in wireless communication devices having a plurality of antennas.

BACKGROUND OF THE INVENTION

Wireless communication systems are well known in the art. In such systems, wireless communication devices typically communicate information (such as voice and data) with each other via one or more wireless channels, e.g., radio frequency (RF) channels. A fundamental performance limitation on such wireless systems, however, arises from the fact that the wireless channels used to convey information are typically subjected to a variety of noise and interference sources. These impairments to the wireless channels degrade overall system performance, for example, by introducing errors into signals demodulated by wireless receivers. While such degradations may be corrected and/or mitigated through a variety of techniques, system designers continue to develop new approaches to combat this problem.

One well-known technique in this regard is sometimes referred to as diversity reception. Such diversity receivers generally comprise a single receiver (meaning, in this case, a device capable of comparing a plurality of received signals) provided with multiple receiving sources in order to receive a given transmitted signal. One type of diversity receiver then attempts to consistently pick the most reliable receiving source, i.e., the signal with the best reception. Thus, if performance of a given receiving source is intermittently impaired, the diversity receiver can optimally identify a better signal source, thereby maintaining or improving receiver performance.

The benefits of diversity receivers are provided, in part, by virtue of spatial diversity between the multiple receiving sources. For example, in wide-area communication systems, diversity receivers often comprise a device referred to as a comparator coupled to a plurality of geographically diverse receivers. The comparator continuously compares the quality of the signals received from each of the diverse receivers and attempts to select the best signal. The resulting signal output by the comparator optimally represents the best possible signal at all times.

A variation of this technique is used in conjunction with portable or mobile communication devices. For mobile applications, spatial diversity through geographically diverse receivers is not possible. Instead, spatial diversity is achieved by equipping the portable or mobile device with a plurality of directional antennas. As known in the art, a directional antenna provides optimal coverage along a specific direction, in contrast to an omindirectional antenna that provides equal coverage in all directions. By diversely aligning the optimal receive paths of the directional antennas, the probability of the wireless device receiving at least one acceptable signal source is increased. The best possible signal is provided at all times by switching between antennas when appropriate. For this reason, this technique is often referred to as antenna switching. Antenna switching as described herein is particularly effective in applications where it is anticipated that reflected signals would be prevalent; for example, indoor applications.

While diversity reception may be employed to improve system performance, a continuing challenge when implementing diversity receivers is how to determine which source should be used at any given moment in order to ensure that received errors are minimized. For example, when the currently used source degrades, the receiver should ideally switch to the best available source. However, it may be that the current source is actually the best available at that moment and switching would only worsen performance. Conversely, even though the current source is acceptable, it may be advantageous to switch to another source that is currently performing even better. Overall, the goal of any diversity reception scheme, including antenna switching, is to minimize the number of errors occurring at a receiver. Ideally, the number of such errors would be zero; however, in reality this goal is unattainable using only diversity reception or, more particularly, antenna switching, because it is entirely possible for a wireless channel to severely degrade during reception of a signal thereby resulting in completely unpredictable errors. The goal, therefore, of any diversity reception technique is actually to reduce the number of errors detected to be the number of undetectable, and therefore unavoidable, errors. Techniques that help system designers achieve this goal would represent an advancement of the art.

SUMMARY OF THE INVENTION

The present invention provides a technique for a wireless communication device to select a signal source with which to receive payload data from amongst a plurality of signal sources. Preferably, each signal source is a directional antenna. Each signal source effectively represents a receive channel. The quality of the channel for each receive signal source is determined in part by examining data collected during reception of test data. Substantially simultaneously, payload data is also used to evaluate channel quality for at least one signal source. Thus, a quality metric calculated for any given signal source is preferably the result of measurements made upon test and payload data. In one embodiment of the invention, the parameters used to calculate the quality metric are divided into two sets of parameters, those based on the test data and those based on the payload data. Preferably, the types of parameters in the first set are not identical to the types of parameters as in the second set. Parameters preferably used to determine the quality metric for a signal source comprise jitter, received signal strength, CRC errors and synchronization errors. Selection of a new signal source preferably occurs only when the current payload signal source compares unfavorably with a threshold. By continuously updating quality metrics based on both test and payload data, more reliable assessments can be made of the various signal sources being used. As a result, signal source selection is rendered commensurately more reliable thereby improving received signal quality. These and other advantages will be apparent from the detailed description that follows.

BRIEF DESCRIPTION OF THE DRAWINGS

In the detailed description of presently preferred embodiments of the present invention which follows, reference will be made to the drawings comprised of the following figures, wherein like reference numerals refer to like elements in the various views and wherein.

DETAILED DESCRIPTION OF THE PREFERRED EMBODIMENT

Figure 1:
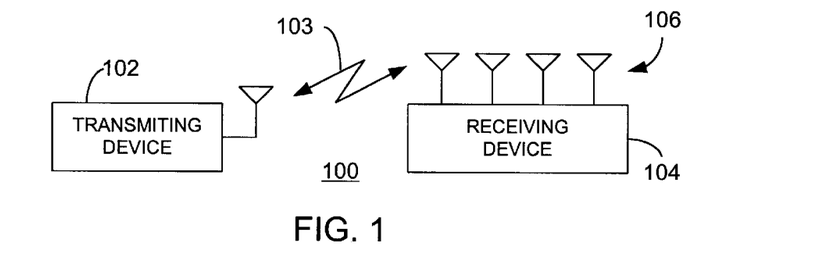
FIG. 1 is a block diagram of a wireless communications system in accordance with the present invention.

The present invention may be more fully described with reference to FIGS. 1–9. FIG. 1 illustrates a block diagram of a wireless communication system 100 comprising a wireless transmitting device 102 and a wireless receiving device 104 that communicate with each other via at least one wireless channel 103. While only a single transmitting device and a single receiving device are shown, such systems typically comprise a plurality of transmitting and receiving devices. The transmitting device 102 and receiving device 104 may comprise stationary or mobile devices or both and, in a preferred embodiment, both comprise mobile devices used in an in-home environment. For the sake of simplicity, various infrastructure devices (e.g., repeaters, base stations, etc.) that are often used to facilitate wireless communications are not depicted in FIG. 1. However, it is understood that the present invention may be equally applied to wireless communication systems employing such infrastructure devices. The at least one wireless channel 103 may comprise any wireless media including, but not limited to, one or more infrared carriers, RF carriers, etc. Furthermore, the present invention is not limited by the manner in which the at least one wireless channel 103 is modulated. In a preferred embodiment, the at least one wireless channel 103 comprises a frequency modulated RF carrier in the so-called Unlicensed—National Information Infrastructure (U-NII) band located at 5.15–5.35 GHz and 5.725–5.825 GHz.

The receiving device 104 also preferably comprises a plurality of antennas 106 used for diversity reception. While any number of antennas may be used, the plurality of antennas 106 preferably comprises at least one transmitting antenna and a plurality of receiving antennas. Furthermore, while any one type or combination of types of antennas may be used, transmitting antennas preferably comprise omnidirectional antennas and receiving antennas preferably comprise directional antennas, such as linearly or circularly polarized patch antennas. In one embodiment of the present invention, the plurality of antennas 106 comprises one omnidirectional transmitting antenna and four linearly polarized patch receiving antennas. Where directional antennas are used, their particular orientation relative to each other is a matter of design choice. However, in a preferred embodiment, they are oriented to be maximally diverse, i.e., such that the Euclidean distance between the respective optimized receive directions of each antenna is maximized, and such that all potential receive vectors (i.e., 360 degrees) are covered by the directional antennas. In the case of four equivalent directional antennas, this implies that each directional antenna has a beamwidth of at least 90 degrees.

The present invention is primarily described in terms of multiple antennas. However, those having ordinary skill in the art will appreciate that antennas are a single case of what may be referred to as signal sources. In the context of the present invention, a signal source may be defined as any means whereby a transmitted signal is provided for use in diversity reception. As such, signal sources may include antennas coupled to a single wireless receiver through an antenna switch. Alternatively, signal sources may comprise multiple wireless receivers (each having one or more antennas) providing baseband data for diversity reception analysis. Further examples of signal sources may be readily apparent to those having ordinary skill in the art. Although the present invention is described hereinafter in terms of antennas, it is understood that signal sources, as broadly defined herein, may be substituted equally.

Figure 2:
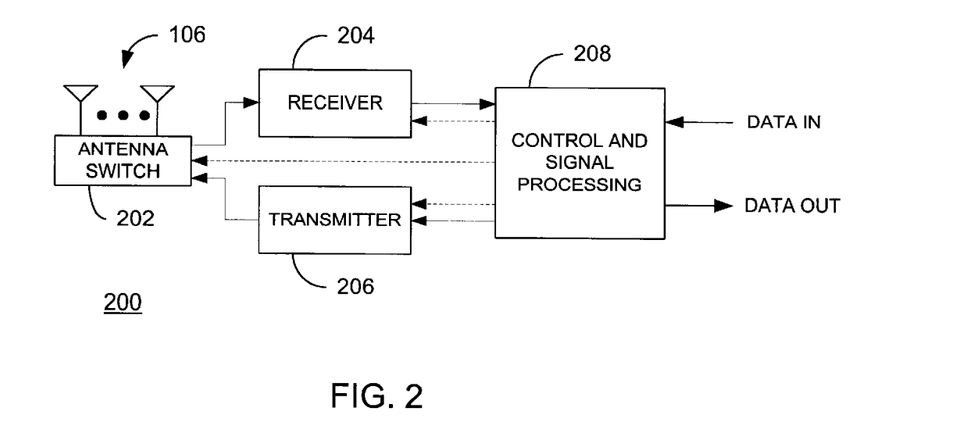
FIG. 2 is a block diagram of a wireless communication device in accordance with the present invention.

Turning now to FIG. 2, there is illustrated a block diagram of a wireless communication device 200 in accordance with the present invention. The wireless communication device 200 comprises the plurality of antennas 106 described above, an antenna switch 202, a wireless receiver 204, a wireless transmitter 206, and a control and signal processing unit 208 arranged as shown. The antenna switch 202 comprises a solid-state or mechanical switching device that at least routes any of the antenna inputs to its receiving output. Where more than one transmitting antenna is provided, the antenna switch 202 may similarly route signals from one or more transmitters (only one shown) to any of the transmitting antennas. The wireless receiver 204 demodulates signals received via the antenna switch 202. In a preferred embodiment, the wireless receiver 204 is an RF receiver operating within the U-NII band. However, other types of receivers are well known in the art and may be equally employed. Likewise, the wireless transmitter 206 modulates a wireless carrier, preferably an RF carrier in the U-NII band. For both the transmitter 206 and receiver 204, any of a variety of well-known modulation and demodulation techniques may be used; the present invention is not limited in this regard.

The control and signal processing unit 208 preferably provides control of the antenna switch 202 and, optionally, the receiver 204 and transmitter 206 as illustrated by the dashed lines. However, it is understood that such control may be provided by and incorporated within, or shared with, other components, e.g., the receiver 204 or transmitter 206 or both. The control functionality and the signal processing functionality embodied by the control and signal processing unit 208 may be incorporated into separate devices, rather than a signal device.

The control and signal processing unit 208 may be a microprocessor, microcontroller, digital signal processor or the like, or a combination of such devices operating under the control of software routines and operational data stored in volatile or non-volatile digital storage devices or both as known in the art. In a preferred embodiment, however, the control and signal processing unit 208 is at least partially implemented in hardware using, for example, one or more application specific integrated circuits (ASICs) or field-programmable gate arrays (FPGAs). A more detailed description of such a hardware embodiment is further described below with respect to FIG. 3.

The control and signal processing unit 208 implements control and processing functions for the wireless communication device 200. In part, the control and signal processing unit 208, and the functionality it implements, operates to take demodulated baseband data from the receiver 204 as input and to provide processed data as output. Processing performed on the demodulated baseband data is well known in the art and includes error correction decoding, etc. In particular, as described below, processing on the demodulated baseband data also includes analysis used for antenna switching purposes. Some or all of this type of processing may be incorporated into the receiver 204 as a matter of design choice. In the opposite direction, the control and signal processing unit 208 takes as input data to be transmitted and, after processing the transmit data in accordance with known techniques (e.g., error correction encoding), provides the transmit data to the transmitter 206 for modulation onto the wireless carrier. Once again, some or all of this functionality may be incorporated into the transmitter 206 as a matter of design choice.

Figure 3:
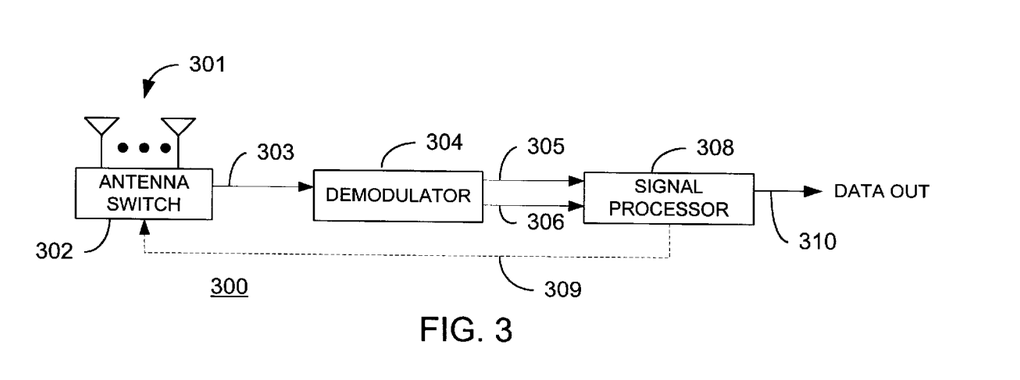
FIG. 3 is a functional block diagram of a wireless receiver front-end in accordance with the present invention.

A more detailed depiction of a wireless receiver front-end 300 in accordance with the present invention is illustrated in FIG. 3. As shown, the wireless receiver front-end 300 comprises a plurality of receiving antennas 301 of the type described above coupled to an antenna switch 302. The antenna switch 302 selectively provides input signals received from the antennas 301 as an output 303 as determined by a control signal 310. The antenna switch 302 is coupled to a demodulator 304 that is, in turn, coupled to a signal processor 308. The signal processor 308 provides a control signal 309 and a data output 310. When implemented, the functionality represented by the demodulator 304 and signal processor 308 may be distributed among separate elements or combined, in whole or in part, within one or more elements. To illustrate with reference to FIG. 2, the demodulator 304 may be implemented entirely by the receiver 204 and the signal processor 308 may be implemented entirely within the control and signal processing unit 208. Alternatively, the receiver 204 may carry out a portion of the signal processor 308 functionality or the control and signal processing unit 208 may carry out a portion of the demodulator 304 functionality. Those having ordinary skill in the art will appreciate that implementation of the functions illustrated in FIG. 3 is a matter of design choice and that the present invention is not limited in this regard.

As known in the art, the demodulator 304 functions to extract data that has been modulated onto a wireless carrier signal. Regardless of how it is implemented, the demodulator 304 takes as input a received modulated carrier signal 303 and provides as output a received baseband signal 305. Further, in a presently preferred embodiment, the demodulator 304 also provides as output received signal strength data 306 indicative of the signal strength of the received wireless carrier. In practice, a variety of techniques for implementing the functionality of the demodulator 304 are well known in the art and typically depends upon the manner in which the carrier signal was modulated.

The signal processor 308 operates upon the received baseband signal 305 and, preferably, upon the received signal strength data 306 so as to provide the control output 309 used to control the antenna switch 302. That is, the control output 309 causes the antenna switch 302 to selectively route the signal provided by one of the antennas to its output 303. The present invention improves determination of the control output 309 such that the data output 310 optimally represents the best possible received data. The manner in which this is done is further described with reference to FIGS. 4–9. Furthermore, in a preferred embodiment, at least the functionality in the signal processor 308 relating to antenna switching is implemented in hardware using FPGAs, ASICs or the like. Optionally, and as depicted in the implementation illustrated in FIG. 3, the signal processor 308 provides the data output 309 comprising reconstructed information representative of the information originally transmitted. To this end, the signal processor 308 may implement a variety of functions well known in the art, such as decryption, error correction decoding, signal conditioning (e.g., filtering), etc.

Figure 4:
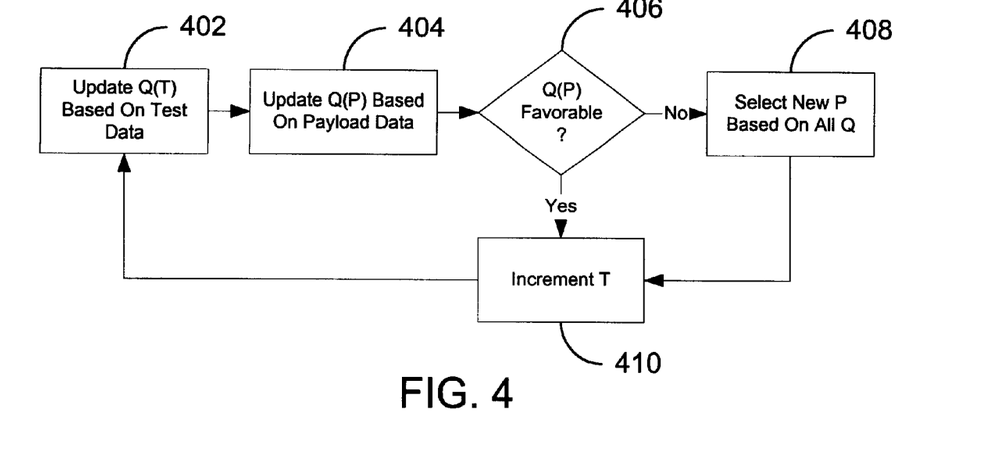
FIG. 4 is a flow chart illustrating a generalized method for antenna selection in accordance with the present invention.

Referring now to FIG. 4, a generalized method for selecting an antenna in accordance with the present invention is illustrated. In particular, steps 402 through 410 illustrate a continuous loop whereby quality metrics Q are continuously determined and assessed for N different receiving antennas. In particular, the present invention provides techniques whereby a given quality metric $Q_j$ is determined based on test data and payload data, thereby providing a more reliable indication of the "quality" of signals provided by the $j^{th}$ receiving antenna. Hereinafter, the variable T is used to indicate an antenna that is currently being tested through the reception of test data, whereas the variable P is used to indicate an antenna that is currently being used to receive payload data, i.e., the antenna whose signal is currently being routed to the output of the antenna switch during payload reception. As used herein, test data indicates data that is used for the purpose of testing the quality of a channel provided by a receiving antenna. Otherwise, test data conveys no information intended for reconstruction or consumption by a user at the receiver. In contrast, payload data is the information that is conveyed with the intent that it will be reconstructed for consumption at the receiver and, in accordance with the present invention, is also used to test the quality of channels provided by receiving antennas.

Thus, at step 402, the quality metric, Q(T), for the antenna currently chosen to receive the test data (the test antenna) is updated based on the received test data and, at step 404, the quality metric, Q(P), for the antenna currently selected to receive payload data (the payload antenna) is updated based on the received payload data. Because channel conditions can change rapidly, it is preferable to perform steps 402 and 404 as closely in time as possible. Furthermore, it is possible for T and P to have the same value, implying that the antenna currently under test is also the same antenna being used to receive payload data.

At step 406, it is determined whether the quality metric for the payload antenna is currently favorable. In the context of the present invention, a favorable quality metric indicates that the channel provided by the antenna to which the quality metric corresponds is performing well enough to provide reliable data output, e.g., data output 309. This step is preferably included so that a good channel will not be abandoned until its performance degrades to the point that a reliable data output (i.e. substantially error free) can no longer be assured. If Q(P) is currently favorable, the processing continues at step 410 where T is incremented and the process is repeated. If, however, Q(P) is no longer favorable, processing continues at step 408 where a new antenna P is selected based on all of the current quality metrics. In other words, when performance of the current payload antenna degrades sufficiently, a new payload antenna is selected based on the current state of the quality metrics. Thereafter, T is incremented so that the process of updating quality metrics may continue. Although the thresholding test of step 406 is preferably implemented, it is understood that step 406 could be eliminated, in which case it is possible that a new payload antenna will be selected for each iteration of test data.

Figure 6A:
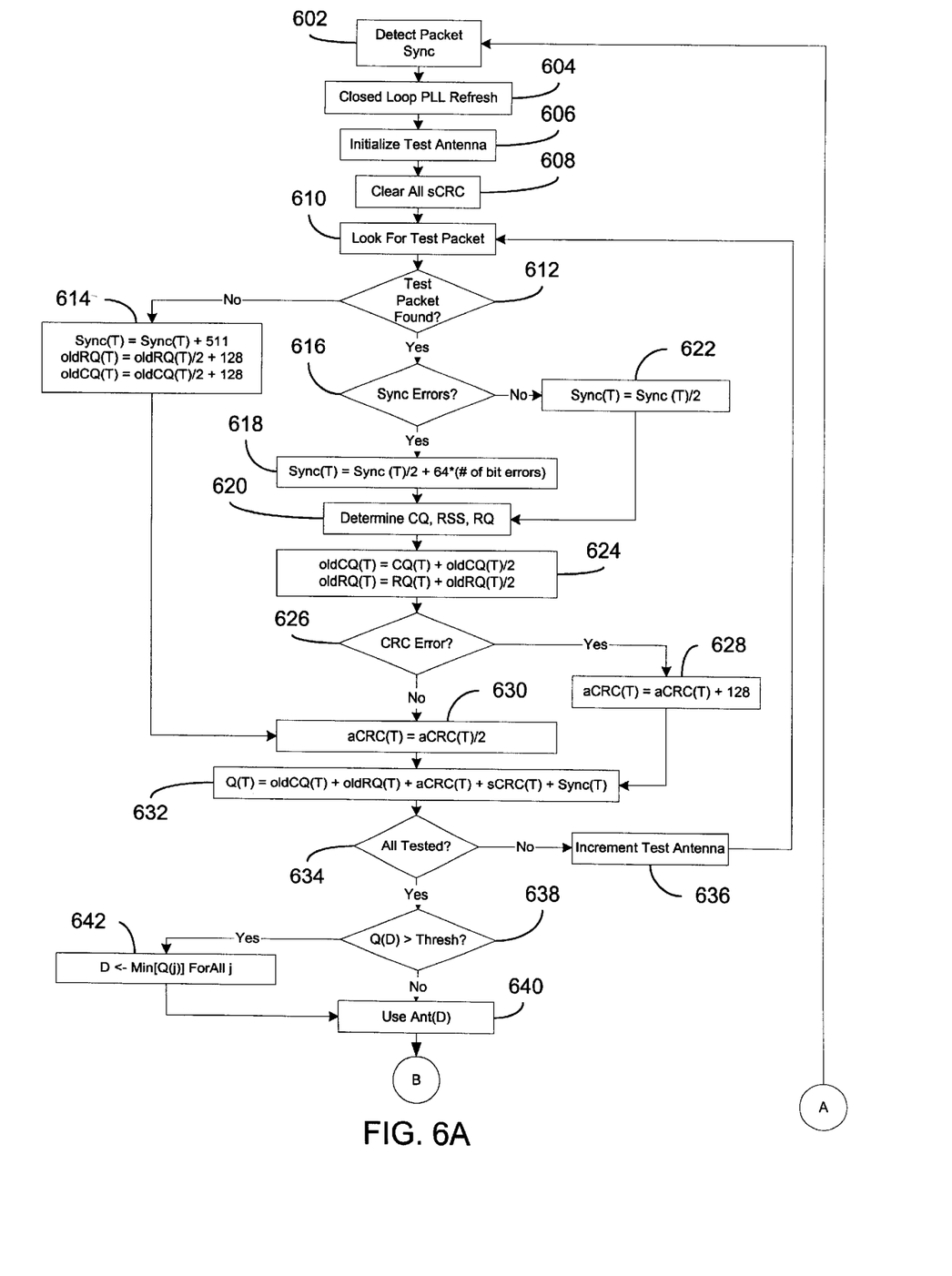
FIGS. 6A and 6B are a flow chart illustrating a preferred embodiment of a method for antenna selection in accordance with the present invention.

Regardless, it should be noted that the particular order of steps 402 through 410 might be varied as a matter of design choice. That is, the order of steps 402 and 404 could be reversed with little or no effect. As another example, steps 406 and 408 could be performed at any time relative to steps 402 and 404, even between steps 402 and 404. In essence, because of the continuous nature of the process of evaluating quality metrics and selecting a payload antenna based thereon, the particular order in which these steps are performed can be arbitrary. In a presently preferred embodiment, all test data for each antenna is sequentially received at step 402, prior to the reception of payload data at step 404. In this embodiment, the determination of step 406 is performed twice; once after the reception of all of the test data and again after the reception of payload data. This preferred embodiment is described in further detail with reference to FIG. 6 below.

Figure 5:
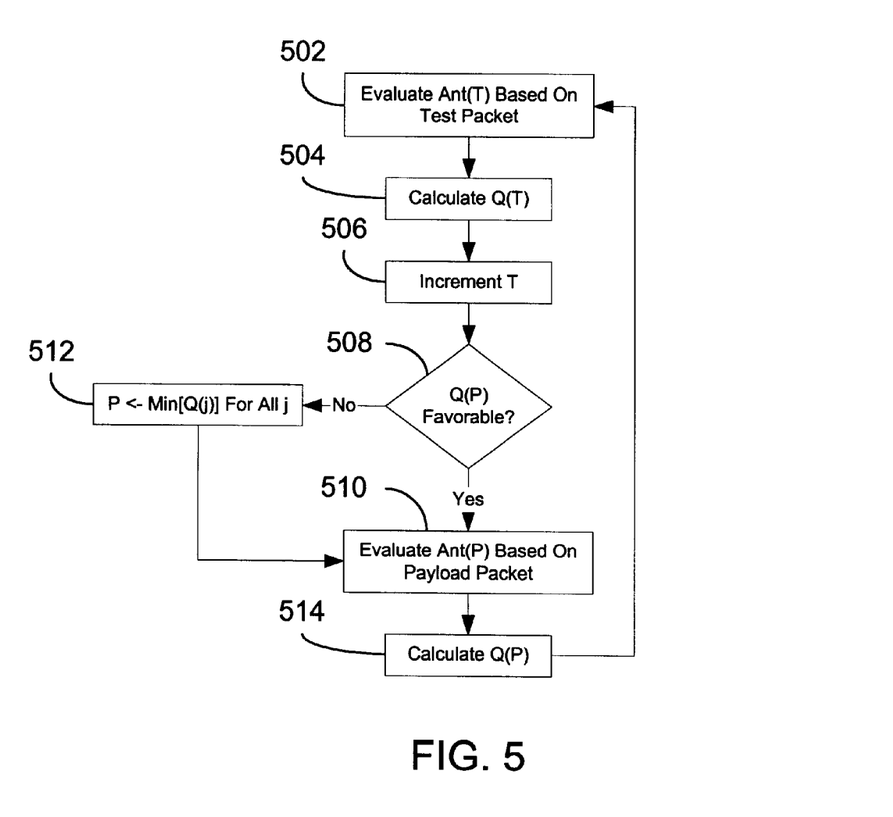
FIG. 5 is a flow chart illustrating one embodiment of a method for antenna selection in accordance with the present invention.

Referring now to FIG. 5, one embodiment of a method for selecting an antenna in accordance with the present invention is illustrated. In particular, the method illustrated in FIG. 5 relies on the use of packetized data transmission in which test data packets are transmitted before each payload packet. The use of packet data systems is well known in the art and need not be described in further detail.

At step 502, the antenna currently selected to receive a test packet, Ant(T), is evaluated based on reception of a test packet. In the context of the present invention, this evaluation consist of measuring and/or calculating the values of various receive parameters based on the received test data, presently preferred examples of which are described in greater detail below. Preferably, the parameters measured/calculated at step 502 comprise a first set of parameters. Using the first set of parameters, the quality metric, Q(T), of the test antenna is updated and stored at step 504. Thereafter, at step 506, T is incremented in anticipation of the next test packet. Because the identity of the test antenna is continuously incremented, the present invention causes quality metrics to be continuously updated, thereby providing greater reliability when using the quality metrics to select an antenna.

At step 508, it is determined whether the quality metric, Q(P), of the current payload antenna is favorable or not, as described above relative to step 406. If not, a new payload antenna P is selected at step 512 based on all of the current quality metric values. The selection of a new antenna may then be manifested through the issuance of a control signal used to control an antenna switch. In a preferred embodiment, the quality metrics values may vary within a fixed range, for example, from 0 to 1023 where a value of 0 represents the best possible (most favorable) quality metric and a value of 1023 represents the worst possible (least favorable) quality metric. Thus, as shown in FIG. 5, P is set to the value of j based on finding the minimum quality metric Q(j) for j=1 to N.

Processing continues at step 510 after selecting a new value for P at step 512 or after determining that Q(P) is favorable at step 508. At step 510, the antenna currently selected as the payload antenna, Ant(P), is evaluated based on reception of a payload (or data) packet. In one embodiment of the present invention, the payload packet occurs immediately after the test packet such that testing based on both occurs substantially simultaneously. As before, the evaluation of the payload packet consist of measuring and/or calculating the values of various receive parameters based on the received payload data, presently preferred examples of which are described in greater detail below. Preferably, the parameters measured/calculated at step 510 comprise a second set of parameters that are not identical to the types of parameters in the first set of parameters measured/calculated at step 502. Using the second set of parameters, the quality metric, Q(P), of the payload antenna is updated and stored at step 514. Thereafter, processing continues at step 502 in anticipation of new test and payload packets. The method illustrated in FIG. 5 is particularly suited for implementations in which forward error correction (FEC) is not used to ensure the integrity of the payload data. However, in practice, it is desirable and often necessary to implement FEC in wireless systems.

Figure 6B:
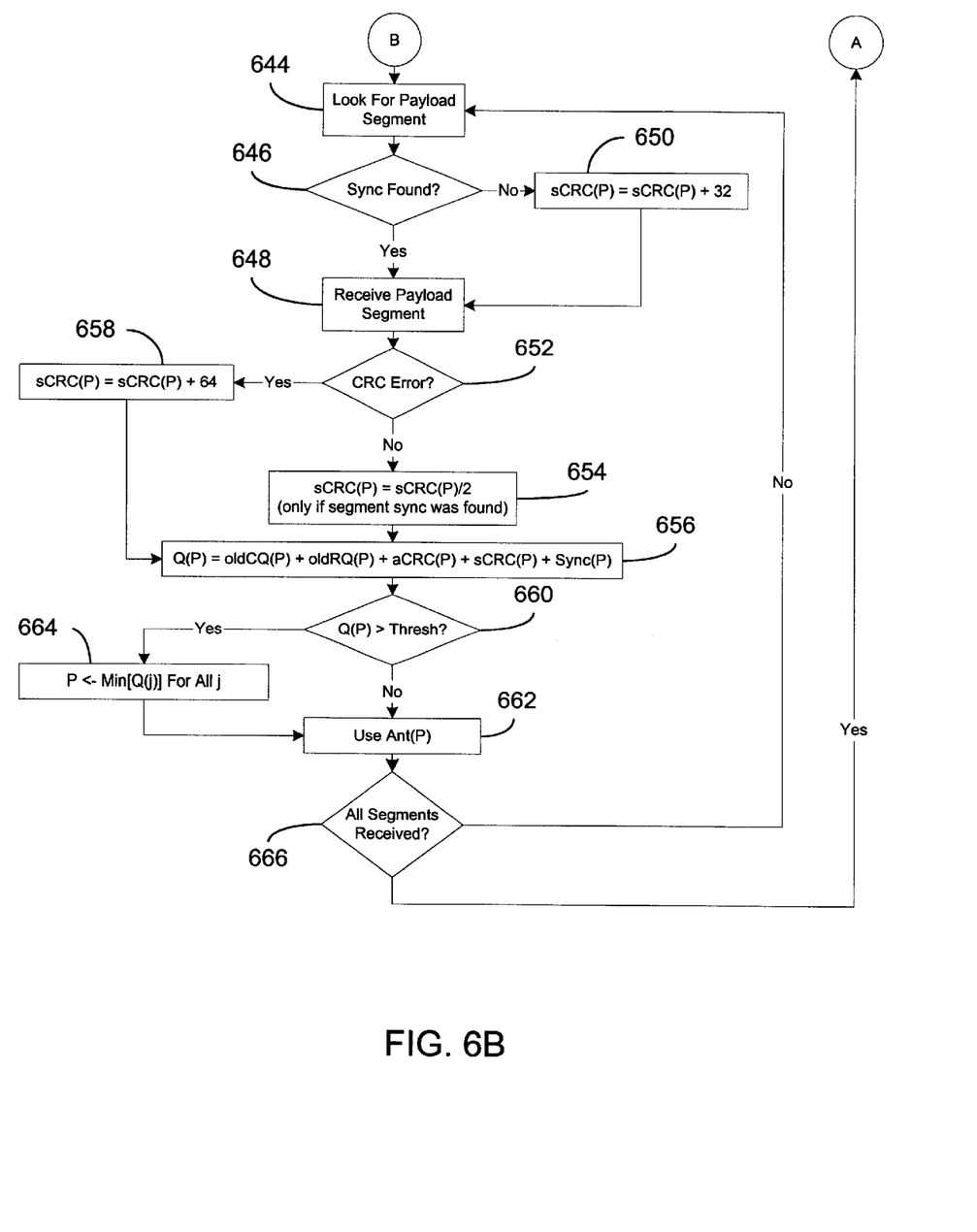

Referring now to FIG. 6, there is illustrated a preferred embodiment of a method for antenna selection in accordance with the present invention. As noted above, the method illustrated in FIG. 6 is preferably implemented in hardware using ASICs, FPGAs or the like. The method illustrated in FIG. 6 is particularly suited for use in packet data systems in which structured packets, incorporating FEC, are used. A preferred form of packet structure is illustrated in FIG. 7.

Figure 7:
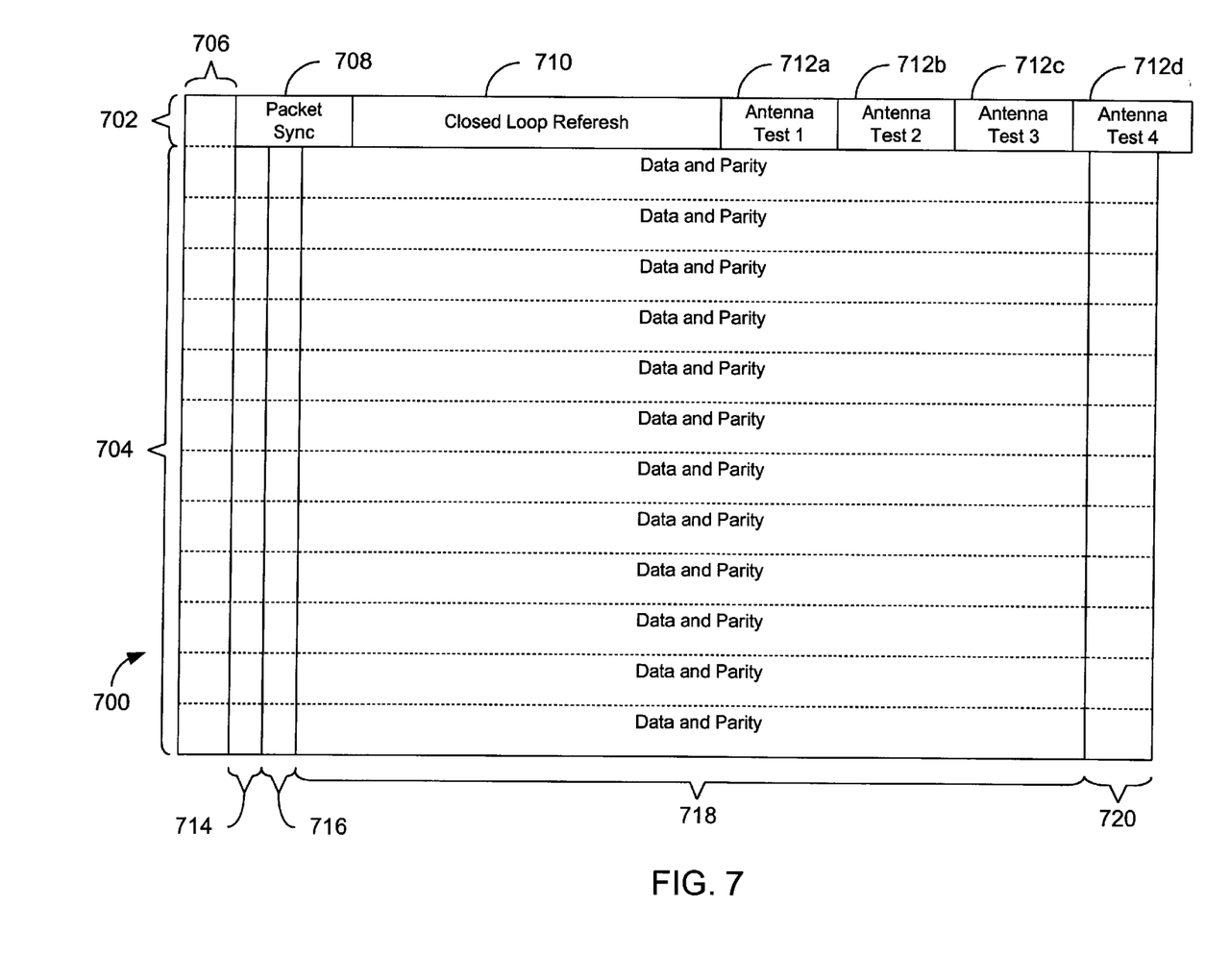
FIG. 7 illustrates a structured packet in accordance with the present invention that is used to implemented the method illustrated in FIGS. 6A and 6B.

As shown in FIG. 7, a structured packet 700 comprises a packet sync segment 702 and a plurality of payload segments 704. Preferably, the structured packet 700 is transmitted or otherwise conveyed by sequentially transmitting the packet sync segment 702 followed by each of the plurality of payload segments 704. The packet sync segment 702 comprises, at its beginning, an antenna switching buffer period 706, followed by a packet sync 708, a closed loop refresh period 710 and a plurality of antenna test packets 712. The antenna switching buffer period 706 is a period of time in which no data is actually transmitted and provides an interval in which an antenna switch may be reliably configured to connect a given antenna input to an output of the antenna switch. In a presently preferred embodiment, the buffer period 706 has duration equivalent to the amount of time normally required to transmit four bytes of data. In practice, the length of the buffer period is a function of the minimum settling time of the antenna switch as well as the data transmission rate.

The packet sync 708 is a predefined length (preferably, eight bytes) data field comprising known data. The packet sync 708 provides large-scale synchronization for the entire structured packet 700. The remainder of the structured packet 700 cannot be received if the packet sync 708 is not found. Because the packet sync 708 is transmitted and received with known periodicity, it is not necessary to receive the entire packet sync 708 with perfect accuracy. In a preferred embodiment, the packet sync 708 may be skewed two bits (to account for phase shifts caused by switching antennas) in either direction and still be detected. This five-bit window allows the packet sync 708 to be robust to channel degradations and still received with high confidence.

Like the buffer period 706, no data is transmitted during the closed loop refresh period 710. The duration of the refresh period 710 is a matter of transmitter and receiver implementation. In a preferred embodiment, the refresh period is equivalent to the transmission time of 141 bytes of data. This accounts for a closed loop refresh of 75 usec. at the transmitter, as well as 15 usec. of phase locked loop programming and wait time at the receiver. It is understood that the length of the refresh period 710 is design dependent and may be adjusted according to the needs of the particular implementation.

Figure 8:
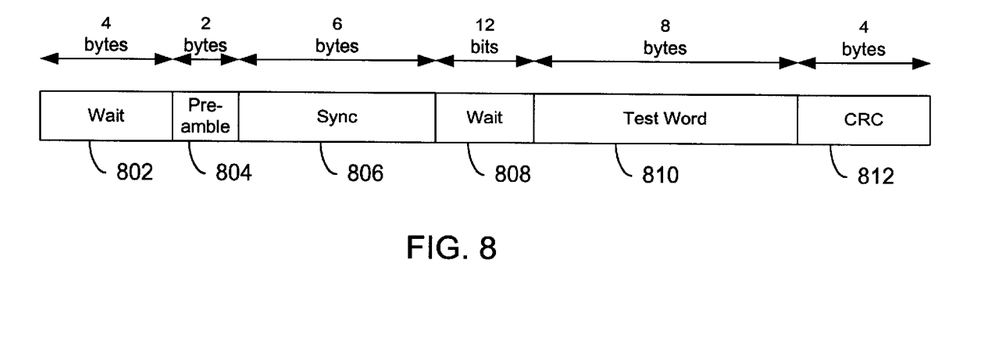
FIG. 8 illustrates a test packet in accordance with a preferred embodiment of the present invention.

The packet sync segment 702 concludes with a plurality of antenna test packets 712. In a preferred embodiment, four antenna test packets (one for each antenna) are transmitted; a greater or lesser number of antenna test packets may be used as a matter of design choice. In general, each test packet 712 (including those used in conjunction with the embodiments illustrated in FIGS. 4 and 5) must at least include known data. By comparing the data received during a test packet against the known data corresponding to that test packet, the performance of a particular antenna may be evaluated. A preferred structure for each of the antenna test packets 712 is illustrated in FIG. 8. As shown, the test packet comprises various fields. The bit lengths shown relative to each field represent presently preferred lengths but, in practice, such lengths are a matter of design choice.

As shown in FIG. 8, each antenna test packet begins with a first wait or buffer period 802 during which no information is transmitted to allow for switching to the desired test antenna. In a preferred embodiment, duration of the first wait period is the time required to transmit four bytes of data. A preamble 804 a succession of alternating bits (AAAA in hexadecimal notation) which carry no information. They allow the receiver to lock onto the transmitter and recover a clock signal, as known in the art. Similar to the packet sync 708, the antenna or test sync 806 is a series of bits that needs to be received correctly to align the receiver to the transmitted bit stream. If the antenna sync 806 is not found, no information in the packet is found. As described in greater detail below, the antenna sync 806 is also used to derive parameters useful in calculating an antenna quality metric. The test word 810 is a known, fixed bit pattern having, for example, the value (in hexadecimal notation) A5A6B654D5929A5A. As described in further detail below, the deterministic nature of the test word 810 allows various measurements to be performed, thereby allowing a quality metric to be determined for the antenna being tested. Finally, an antenna or test cyclic redundancy check 812 is determined based on the test word 810 and is included as way to determine whether there were any errors in the test word 810. The use of CRCs in general is well known in the art and is not described in further detail herein.

Referring again to FIG. 7, the structured packet 700 is shown comprising the preferred number (twelve) of payload segments. Preferably, each of the payload segments comprises the identical structure to all other payload segments, as illustrated in FIG. 7. Each payload segment begins with the identical buffer period 706 to allow for antenna switching between the packet sync segment 702 and the initial payload segment, or for antenna switching between payload segments. The buffer period 706 is followed by a segment sync 714. Preferably, the segment sync 714 is a known bit pattern having a length of one byte. Like the packet sync 708 and the test sync 806, the segment sync 714 ensures that the receiver continues to be aligned with the transmitted bit stream. A one byte header 716 is preferably included in each payload segment. Each header 716 comprises information regarding the type of packet being transmitted and, optionally, version information. A payload segment 718 follows each header 716. Preferably, each payload segment 718 comprises 207 bytes of interleaved data and parity information. The parity information is the result of FEC coding and serves to correct errors in the received data. Finally, each payload segment concludes with a segment CRC 720. The segment CRC 720 is determined relative to the payload segment 718. The segment CRC 720 serves as a means for updating quality metrics determined during reception of the antenna test packets 712, as will be described in greater detail below.

Before describing FIG. 6 in detail, it is noted that the method illustrated therein is based on several quality parameters used to determine quality metrics for receiving antennas. In particular, the quality parameters used include a synchronization (Sync) error parameter, a correlation quality (CQ) parameter, a received signal strength (RSS) parameter and an antenna or test cyclical redundancy code (aCRC) error parameter and a segment cyclical redundancy code (sCRC) error parameter. Those having ordinary skill in the art will recognize that other parameters could be used in place of, or in addition to, the parameters described herein. Regardless of the types of parameters used, a complete set of such parameters is maintained for each antenna under consideration. The measurement of each of these parameters is preferably based, in the case of the Sync, CQ, RSS and aCRC parameters, on test data and, in the case of the sCRC parameter, on payload data. Those having ordinary skill in the art will recognize that other combinations of the test and payload data may be used to determine the various parameters. Each of these parameters and the manner in which the quality metrics are calculated based on these parameters is discussed in greater detail below. Various particular values and thresholds relative to the implementation of these parameters are described below for exemplary purposes. However, it is understood that other values could be equally used as a matter of design choice. The use of penalty adders, etc. below assumes that quality metrics may range from low to high values, with low being favorable and high being unfavorable. However, other comparison methods could be used. For example, higher values could be considered favorable and lower values unfavorable. In this case, rather than using penalty adders, penalty subtractors could be used. Those having ordinary skill in the art will doubtless be able to create a variety of such methods without departing from the scope of the present invention. Additionally, particular techniques for maintaining memory of previous parameter values are described below. However, it is understood that a variety of techniques may be used to implement such memory.

The Sync error parameter is based on the number of errors detected in a received antenna sync 806. Techniques for determining the occurrence and number of errors are well known in the art. The preferred maximum value of the Sync parameter is 511. Additionally, in accordance with the present invention, the Sync error parameter is preferably maintained as a running sum that incorporates memory of its previous values. To this end, if a Sync error is detected (i.e., a test packet is not found), a total equal to the number of detected bit errors multiplied by 64 is added to one half the previous value of the running sum. In the optimal case in which no errors are detected, the update to the Sync parameter defaults to dividing the running sum by two. Note that in accordance with a presently preferred embodiment, test packets will be detected if the number of errors in the test packet is less than twelve.

Figure 9:
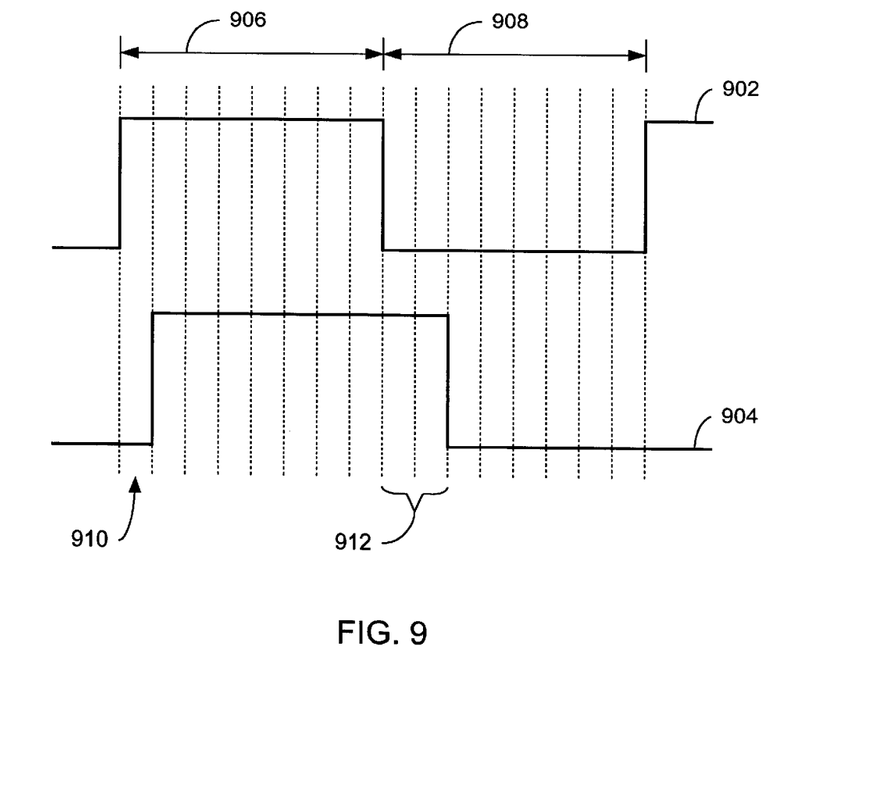
FIG. 9 illustrates exemplary waveforms for determining a parameter that, in turn, is used to establish quality metrics in accordance with the present invention.

During the reception of each test packet, the correlation between the received test word and the known test word is measured to determine the CQ parameter. In a presently preferred implementation, each bit of the received test word is over-sampled by a factor of 8. Thus, each bit of the received test word will ideally comprise eight samples that, if perfectly received, would correlate exactly with eight samples of the corresponding bit in the known test word. By comparing the received test word samples with the known test word samples, it is possible to obtain a measurement of the jitter induced by the channel in the received test word. Thus, the samples for each bit in the received test word are treated as a set and compared with a corresponding set from the ideal test word. The number of consecutive errors (i.e., non-matching samples) is counted for each set. This is illustrated in FIG. 9 where waveforms representative of a known test word 902 and a received test word 904 are shown. In particular, two bits 906, 908 of each waveform are shown. The dotted lines illustrate the eight-times over-sampling done on each bit to provide a set of samples for each bit. Relative to the first bit 906, one of the samples 910 is in error; relative to the second bit 908, two consecutive bits 912 are in error. Although consecutive errors are illustrated atthe beginning of the second bit 908, in practice consecutive errors may occur anywhere within a single bit period. The number of consecutive errors arising from each set causes the addition of a corresponding penalty value to the CQ parameter. Each penalty value represents how far off the received edges are from the expected edges. Exemplary penalty values are illustrated in Table 1 below. The values illustrated in Table 1 assume that CQ is an eight-bit number, and that any penalty values that cause CQ to go above 255 will be ignored.

TABLE 1

| Number of Consecutive Errors | Adder |
| --- | --- |
| 1 | 1 |
| 2 | 32 |
| 3 | 64 |
| 4 or more | 128 |

Tests have shown that CQ does predict bit errors. However, it tends to be noisy in that the value can jump from very high to very low between packets. It is possible for an antenna to have a high CQ several packets before a data packet with errors, followed by a very low CQ immediately before the bad packet. If some memory of the high CQ is kept, tests have shown that it is sometimes possible to switch off of the bad antenna before the bit error is detected. Thus, a running sum of old (previous) CQ values is preferably maintained. In particular, after every antenna test, the running sum is first divided by two and the current value of CQ is then added to the running sum. In this way, the old values have a continually decreasing influence on the choice of receive antenna. An additional benefit of this memory is the smoothing out of the CQ factor, preventing some unnecessary switching between antennas.

As its name would imply, the received signal strength parameter describes the strength of received signal over the channel currently being tested. Techniques for assessing received signal strength are well known in the art. In a presently preferred embodiment, an RSS of 0 ideally corresponds to no signal and an RSS of 240 ideally corresponds to a very strong signal. Note that this range of values is dependent upon current implementations and is, essentially, an arbitrary range. Other ranges of value may be equally employed as a matter of design choice. Where the RSS value is determined based on a conversion of an analog signal to digital values, changing the voltage reference on the analog-to-digital converter can increase the dynamic range of measured RSS values. Regardless, the RSS value is used to derive a received signal strength quality (RQ) factor that is, essentially, a penalty value. Tests have shown that changes in received signal strength, whether increasing or decreasing, are a strong indicator of poor channel quality. In a presently preferred embodiment, the RQ factor is determined as follows. First, the absolute value of the difference between the previous RSS and current RSS, minus one to allow room for noise, is determined, as shown in Equation 1 below:

$$|RSSI_{k-1} - RSSI_k| - 1 \qquad \text{Eq.(1)}$$

To determine the RQ, the value derived from Equation 1 is multiplied by a constant to determine RQ. Note that the lack of change in RSS values (i.e., that the previous RSS value is the same as the current RSS) will result in RQ being set to zero. Otherwise, the multiplier constant is chosen based on the current RSS value. Exemplary multiplier constants are illustrated in Table 2 below.

TABLE 2

| Current RSS | RQ Multiplier |
| --- | --- |
| 220 <= RSS | 0 |
| 185 <= RSS < 220 | 1 |
| 150 <= RSS < 185 | 2 |
| 115 <= RSS < 150 | 4 |
| 80 <= RSS < 115 | 8 |
| RSS <80 | 16 |

The values illustrated in Table 2 assume that RQ is an eight-bit number, and that any difference value or multiplier that causes RQ to go above 255 will be ignored. Additionally, the RQ parameter is maintained as a running sum in a manner similar to the other parameters—the new RQ penalty is added to one half of a running sum to derive the new running sum.

It is possible for the channel in use to change within a single test or data packet. In this case, there is no prior notification that the data will be bad; therefore, this type of error cannot be avoided by antenna switching. However, since packets containing bit errors tend to come in groups, the antenna that received data containing a bit error should be penalized so that the antenna switching algorithm will be disposed to switch to a different antenna. This situation is addressed in part by the aCRC error parameter. The antenna CRC 812 included in each test packet 712 serves as the basis for the aCRC parameter. Techniques for determining the occurrence of CRC errors are well known in the art. In accordance with the present invention, the aCRC error parameter preferably maintains memory of previous values using a running sum. To this end, if a CRC error is detected during the reception of a test packet, the running sum representative of the aCRC error parameter is preferably incremented by 128, with the maximum possible value of the CRC error parameter set to 255. Each time a test packet is received without CRC errors, the running sum representative of the aCRC error parameter is preferably divided by two.

While the present invention incorporates the use of antenna test packets 712 to evaluate the antennas in order to select the optimal antenna, it is recognized that channel conditions may change rapidly, particularly during the reception of payload data. To this end, the segment CRCs 720 are used to derive the sCRC error parameter. As described below, the sCRC error parameter is used to update quality metrics corresponding to antennas used to receive the payload data. In accordance with the present invention, the aCRC error parameter preferably maintains memory of previous values using a running sum. To this end, if a CRC error is detected during the reception of a payload segment

718, the running sum representative of the sCRC error parameter is preferably incremented by 64, with the maximum possible value of the sCRC error parameter set to 255. Each time a payload segment 718 is received without CRC errors, the running sum representative of the sCRC error parameter is preferably divided by two. Additionally, as described below, the sCRC error parameter is also used as a means to reflect any failures to detect a segment sync 714. To this end, if a segment sync 714 is not found, the running sum representative of the sCRC error parameter is preferably incremented by 32. Although it is presently preferred to reflect errors during a segment sync 714 in the sCRC error parameter, it is understood that such errors could be reflected in another, separate parameter.

The quality metric (Q) for each antenna is preferably the sum of all the penalty adders (parameters), although it is understood that other combinations of the parameters may be used. In a preferred embodiment, each quality metric is represented as a 10-bit number. In this embodiment, each quality metric is limited to 1023 regardless of whether the sum of the factors is greater than 1023. Adhering to the protocol that lower quality metrics are more favorable than higher quality metrics, the most favorable antenna will be initially chosen as the antenna with the lowest Q. Thereafter, antennas having the lowest quality metrics are continuously identified and selected. In a preferred embodiment, such selection occurs only when the current antenna's quality metric has become sufficiently unfavorable as determined by a threshold comparison. Preferably, this threshold is set at 127. This is preferably implemented to prevent a switch from a very good antenna to a less favorable one due to noise in the quality metrics.

Referring again to FIG. 6, a more detailed embodiment of the present invention is now described. In a packet-based communication system, it is possible to anticipate the reception of certain data, such as the structured packet 700 illustrated in FIG. 7. Thus, at step 602, the antenna referenced by the index P is used to detect the packet sync 708. If the packet sync 708 is not detected one time, it is ignored and attempts are made to receive the remainder of the packet 700. However, if the packet sync 708 is not detected for two consecutive packets 700, then a search mode is entered and the method of FIG. 6 is ignored. Assuming that packet sync 708 is found, processing continues at step 604 where the refresh period 710 is allowed to expire. At step 606, the test antenna index, T, is initialized. In a preferred embodiment, the four antennas used are logically labeled 0 through 3, and the index T is initialized to 0 and incremented thereafter. Of course, other indexing schemes could be used as a matter of design choice. At step 608, the running sums representative of the sCRC error parameter for each antenna is initialized to zero. Note that steps 606 and 608, rather than being performed subsequent to step 604, may be performed simultaneous to step 604.

Regardless, at step 610, and after the expiration of the refresh period 710, the receiving device knows to look for a test packet at a predetermined time. In particular, the receiving device inspects baseband data received via the current test antenna (T) looking for preamble 804 and synchronization 806 fields indicative of the beginning of a new received test packet. If the test packet is not found at step 612, processing continues at step 614 where the Sync parameter for the test antenna is incremented (penalized) by a preferred value of 511. Furthermore, the failure to detect the synchronization field also has an effect on the RQ and CQ parameters, as well as the CRC parameter. In particular, the running sums representing the RQ and CQ parameters (shown in FIG. 6 as oldRQ and oldCQ, respectively) are updated as described above, e.g., the running sum is divided by two and then incremented by the preferred value of 128. In this manner, the failure to receive a test packet synchronization field imparts a substantial penalty on the antenna currently being tested. Processing then continues at step 630 where the aCRC parameter is divided by two. This helps ensure that the aCRC parameter and the Sync parameter remain independent of each other, thereby preventing the loss of test sync from doubly penalizing an antenna. Subsequently, at step 632, the quality metric for the antenna being tested, Q(T), is updated based on the now-updated values of the RQ, CQ, aCRC and Sync parameters, as well as the current sCRC parameter. In particular, the test antenna quality metric is preferably calculated as the sum of the CQ, RQ, aCRC, sCRC and Sync parameters (all represented as running sums).

Referring once again to step 612, if the test packet is found, i.e., ifthe synchronization field is correctly received, processing continues at step 616 where it is determined whether any errors were found in the detected test sync. If not, the Sync parameter for the test antenna is divided by two at step 622. Processing then continues at step 620 where current values for the CQ and RSS/RQ parameters are determined as described above. Thereafter, at step 624, the running sums for the CQ (oldCQ) and RQ (oldRQ) parameters are updated. However, at step 618, if errors were found in the detected test sync, the number of bit errors found is multiplied by 64 and the resulting product added to one half the running sum representative of the Sync parameter for the test antenna. Thereafter steps 620 and 624 are performed as previously described.

At step 620, it is determined whether a CRC error was detected during the reception of the test packet. To this end, the test CRC 812 is received and compared with a CRC value calculated based on the received test word 810. If a CRC error is detected, the aCRC parameter for the test antenna is incremented by the preferred value of 128 at step 628. If no CRC error is detected, the aCRC parameter is divided by two at step 630. Subsequently, the test antenna quality metric is thereafter updated in accordance with step 632, as previously described.

At step 634, it is determined whether all antennas have been tested. Stated another way, it is determined whether all of the test packets 712 have been received. If not, the test index T is incremented at step 636 so that the next test packet will be used to test another antenna. Note that step 634 could be implemented at other points within the sequence of steps shown in FIG. 6 as a matter of design choice.

As described above, it is a feature of the present invention that a new payload antenna will not be chosen (based on the quality metrics) unless the current payload antenna is performing sufficiently unfavorably. This is shown at step 638 as a comparison of the current payload antenna's quality metric, Q(P), against a predetermined threshold. (Recall that the payload antenna index P is independent of the test antenna index T, although they can have the same value at any given time.) In a preferred embodiment, the threshold is set to 127. Thus, if the quality metric is not greater than the threshold, indicating a favorable channel via the currently selected payload antenna, the payload antenna remains unchanged at step 640. If the quality metric is above the threshold, indicating an unfavorable channel, processing continues at step 642 where a new payload antenna is selected. In a preferred embodiment, the selection is accomplished by comparing the quality metrics for each of the receive antennas and selecting the antenna corresponding to the quality metric having the minimum value. Having selected a new antenna P in this manner, a control signal may be generated for use in controlling an antenna switch. As noted previously, the correspondence of minimum and maximum value quality metrics with favorable and unfavorable antenna performance, respectively, is but one possible scheme and those having ordinary skill in the art can readily devise other such schemes still within the scope of the present invention.

Regardless of whether the payload antenna index P is newly selected or the previously used value, processing continues at step 640 by switching (if necessary) to the payload antenna specified by the index P. As with the test packet at step 610, the receiving device now looks for a payload segment at step 644 (FIG. 6B). Preferably, the payload segments 704 occur immediately after the packet sync segments 702 such that evaluations based on both occur substantially simultaneously. In the context of the present invention, "substantially simultaneously" means within the time period defined by a packet having test and payload data. In looking for the payload segment, the receiving device inspects baseband data received via the payload antenna looking for a segment sync 714 indicative of the beginning of a new received payload segment. If the segment sync 714 is not found at step 646, processing continues at step 650 where the sCRC parameter for the payload antenna is incremented (penalized) by the preferred value of 32. In a presently preferred embodiment, there is a five-bit window on the segment sync detection, i.e., the segment sync can be detected if it is +/− two bits from its expected position. If it is not found within this window, the algorithm defaults to assuming that the segment sync is in the expected position when attempting to receive the data.

If the segment sync 714 is detected, or after incurring a penalty for failure to detect it, processing continues at step 648 where attempts are made to receive the payload segment 718. After that payload segment has been received, the segment CRC 720 is received. As with the test CRC 812, the segment CRC 720 is compared with a CRC calculated based on the received payload segment 718. If any errors are detected through this comparison, at step 652, processing continues at step 658 where the sCRC parameter for the payload antenna is incremented (penalized) by the preferred value of 64. Conversely, if no CRC errors are detected, processing continues at step 654 where the running sum representing the sCRC parameter for the payload antenna is divided by two, subject to the condition that the segment sync 714 was previously detected. If the segment sync was not previously detected and no CRC errors were detected, the sCRC parameter is unchanged. Stated another way, the failure to find the segment sync at step 646 causes incurrence of a penalty at step 650; allowing the error free reception of the segment CRC to divide the running sum would effectively undo the penalty for failure to receive the segment sync 714.

Regardless of whether the segment CRC was received with our without errors, processing continues at step 656 where the quality metric for the payload antenna, Q(P), is updated based on the now-updated value of the sCRC parameter, and the previous values of the CQ, RQ aCRC and Sync parameters. As before, the test antenna quality metric is preferably calculated as the sum of the CQ, RQ, aCRC, sCRC and Sync parameters (all represented as running sums).

Incorporating the updated quality metric resulting from the reception of the payload segment, the decision and selection process described above relative to steps 638 through 642 is repeated at steps 660 through 664. That is, if the current payload antenna's quality metric, Q(P) compares favorably with the predetermined threshold, the payload antenna remains unchanged. If the quality metric compares unfavorably with the threshold, a new payload antenna is selected corresponding to the quality metric having the minimum (most favorable) value. Having selected a new antenna P in this manner, a control signal may be generated for use in controlling an antenna switch.

Finally, at step 666, it is determine whether all payload segments 718 have been received. Recall that, in a preferred embodiment, each structured packet 700 comprises twelve payload segments. If further payload segments remain, processing continues at step 644 where searching is performed for the next payload segment. In this manner, each payload segment offers the opportunity to update the sCRC parameter and, consequently, the opportunity to switch payload antennas in the event that the current payload channel degrades. If, however, all segments have already been received, processing continues at step 602 where searching is performed for the next structured packet 700.

The present invention provides a technique for a wireless communication device to select an antenna with which to receive payload data from amongst a plurality of antennas. Using test data and payload data, quality metrics for each of the plurality of antennas are determined. The quality metrics are then used to select an antenna for receiving the payload data. By continuously updating quality metrics based on both test and payload data, more reliable assessments can be made of the various antennas being used. As a result, antenna selection is rendered commensurately more reliable thereby improving received signal quality.

While the foregoing detailed description sets forth presently preferred embodiments of the invention, it will be understood that many variations may be made to the embodiments disclosed herein without departing from the true spirit and scope of the invention. This true spirit and scope of the present invention is defined by the appended claims, to be interpreted in light of the foregoing specifications.

What is claimed is:

1. In a wireless communication device, a method for evaluating signal sources of a plurality of signal sources, the method comprising steps of determining at least one test quality metric uniquely corresponding to at least one test signal source of the plurality of signal sources;

determining at least one payload quality metric uniquely corresponding to a payload signal source of the plurality of signal sources substantially simultaneously with the step of determining the at least one test quality metric, wherein test data and payload data are contained on a signal generated by the wireless communication device; and evaluating at least some of the plurality of signal sources based at least upon the at least one test quality metric and the at least one payload quality metric.

2. The method of claim 1, wherein the plurality of signal sources comprises a plurality of antennas.

3. The method of claim 1, further comprising a step of:

selecting a new payload signal source from the plurality of signal sources based at least upon the at least one test quality metric and the at least one payload quality metric.

4. The method of claim 3, wherein the step of selecting further comprises selecting the new payload signal source based at least upon a previous payload quality metric corresponding to the payload signal source comparing unfavorably with a threshold.

5. The method of claim 3, wherein the step of selecting further comprises selecting the new payload signal source at least based upon the at least one payload quality metric comparing unfavorably with a threshold.

6. The method of claim 1, wherein the at least one test quality metric is based at least upon a jitter value measured during the reception of test data.

7. The method of claim 1, wherein the at least one test quality metric is based at least upon received signal strength value measured during the reception of test data.

8. The method of claim 1, wherein the at least one test quality metric is based at least upon any of: at least one previous jitter value measured during the reception of previous test data, at least one previous received signal strength value measured during the reception of the previous test data, at least one previous CRC error value calculated during the reception of the previous test data, and at least one previous synchronization error value calculated during the reception of the previous test data.

9. The method of claim 1, wherein the at least one payload quality metric is based at least upon an error value calculated during the reception of payload data.

10. The method of claim 1, wherein the at least one payload quality metric is based at least upon a synchronization error value calculated during the reception of payload data.

11. The method of claim 1, wherein the at least one payload quality metric is based at least upon any of: at least one previous CRC error value calculated during the reception of previous payload data and at least one previous synchronization error value calculated during the reception of the previous payload data.

12. In a wireless communication device, a method for determining a quality metric for at least one signal source, the method comprising steps of
  calculating a first set of quality parameters for the at least one signal source based on reception of test data;
  calculating a second set of quality parameters for the at least one signal source based on the reception of payload data, wherein the first set of quality parameters are not identical to the second set of quality parameters, and wherein the test data and the payload data are contained on a signal generated by the wireless communication device; and
  determining the quality metric based at least upon the first and second sets of quality parameters.

13. The method of claim 12, wherein the first set of quality parameters comprises any of: a jitter value measured during the reception of the test data and a received signal strength value measured during the reception of the test data.

14. The method of claim 13, wherein the quality metric is at least based upon any of: at least one previous jitter value measured during the reception of previous test data and at least one previous received signal strength value measured during the reception of the previous test data.

15. The method of claim 12, wherein the second set of quality parameters comprises any of: a CRC error value calculated during the reception of the payload data and a synchronization error value calculated during the reception of the payload data.

16. The method of claim 15, wherein the quality metric is at least based upon any of: at least one previous CRC error value calculated during the reception of previous payload data and at least one previous synchronization error value calculated during the reception of the previous payload data.

17. The method of claim 12, wherein the at least one signal source is at least one antenna.

18. In a wireless communication device, a method for evaluating a plurality of signal sources, the method comprising steps of:
  evaluating each of the plurality of signal sources based upon reception of test data to provide a plurality of quality metrics;
  selecting a payload signal source based on the plurality of quality metrics; and
  updating a quality metric corresponding to the payload signal source based upon the reception of payload data to provide an updated quality metric, wherein the test data and the payload data are contained on a signal generated by the wireless communication device.

19. The method of claim 18, wherein the step of selecting ftrther comprises selecting the payload signal source based at least upon a previous quality metric corresponding to a previous payload signal source comparing unfavorably with a threshold.

20. The method of claim 18, wherein the step of selecting further comprises selecting the payload signal source at least based upon a quality metric of the plurality of quality metrics corresponding to a previous payload signal source comparing unfavorably with a threshold.

21. The method of claim 18, further comprising a step of:
  selecting a new payload signal source based at least upon the updated quality metric.

22. The method of claim 21, wherein the step of selecting the new payload signal source further comprises selecting the new payload signal source based at least upon the updated quality metric comparing unfavorably with a threshold.

23. The method of claim 18, wherein the plurality of signal sources comprises a plurality of antennas.

24. A wireless communication device comprising:
  a plurality of antennas; and
  a signal processing unit, operably coupled to the plurality of antennas, that substantially simultaneously determines at least one test quality metric uniquely corresponding to at least one test antenna of the plurality of antennas and at least one payload quality metric uniquely corresponding to a payload antenna of the plurality of antennas, and that selects a new payload antenna from the plurality of antennas at least based upon the at least one test quality metric and the at least one payload quality metric, wherein test data and payload data are contained on a signal generated by the wireless communication device.

25. The wireless communication device of claim 24, wherein the signal processing unit selects the new payload antenna based at least upon a previous payload quality metric corresponding to the payload antenna comparing unfavorably with a threshold.

26. The wireless communication device of claim 24, wherein the signal processing unit selects the new payload antenna at least based upon the at least one payload quality metric comparing unfavorably with a threshold.

27. The wireless communication device of claim 24, further comprising:
  a wireless receiver, operably coupled to the plurality of antennas and the signal processing unit, operating in a U-NII band.

28. The wireless communication device of claim 24, wherein at least some of the plurality of antennas are directional antennas.

29. The wireless communication device of claim 24, wherein the plurality of antennas comprises at least one omnidirectional transmit antenna.

30. A wireless communication device comprising:

a plurality of antennas; and a signal processing unit, operably coupled to the plurality of antennas, that calculates a first set of quality parameters for one of the plurality of antennas based on reception of test data and a second set of quality parameters for the one of the plurality of antennas based on the reception of payload data, and that determines a quality metric for the one of the plurality of antennas based on the first and second sets of quality parameters, wherein the first set of quality parameters are not identical to the second set of quality parameters, and wherein the test data and the payload data are contained on a signal generated by the wireless communication device.

31. The wireless communication device of claim 30, wherein the signal processing unit calculates the first set of quality parameters comprising any of: a jitter value measured during the reception of the test data and a received signal strength value measured during the reception of the test data.

32. The wireless communication device of claim 30, wherein the signal processing unit determines the quality metric at least based upon any of: at least one previous jitter value measured during the reception of previous test data and at least one previous received signal strength value measured during the reception of the previous test data.

33. The wireless communication device of claim 30, further comprising:

a wireless receiver, operably coupled to the plurality of antennas and the signal processing unit, operating in a U-NII band.

34. The wireless communication device of claim 30, wherein at least a portion of the plurality of antennas are directional antennas.

35. The wireless communication device of claim 30, wherein the plurality of antennas comprises at least one omnidirectional transmit antenna.

36. A wireless communication device comprising:

a plurality of antennas; and a signal processing unit, operably coupled to the plurality of antennas, that evaluates each of the plurality of antennas based upon reception of test data to provide a plurality of quality metrics, selects a payload antenna based on the plurality of quality metrics, and that updates a quality metric corresponding to the payload antenna based upon the reception of payload data to provide an updated quality metric, wherein the test data and the payload data are contained on a signal generated by the wireless communication device.

37. The wireless communication device of claim 36, wherein the signal processing unit selects the payload antenna based at least upon a previous quality metric corresponding to a previous payload antenna comparing unfavorably with a threshold.

38. The wireless communication device of claim 36, wherein the signal processing unit selects the payload antenna at least based upon a quality metric of the plurality of quality metrics corresponding to a previous payload antenna comparing unfavorably with a threshold.

39. The wireless communication device of claim 36, wherein the signal processing unit selects a new payload antenna based at least upon the updated quality metric.

40. The wireless communication device of claim 39, wherein the signal processing unit selects the new payload signal source based at least upon the updated quality metric comparing unfavorably with a threshold.

41. The wireless communication device of claim 36, further comprising:

a wireless receiver, operably coupled to the plurality of antennas and the signal processing unit, operating in a U-NII band.

42. The wireless communication device of claim 36, wherein at least a portion of the plurality of antennas are directional antennas.

43. The wireless communication device of claim 36, wherein the plurality of antennas comprises at least one omnidirectional transmit antenna.

44. An integrated circuit for use in selecting a signal source from amongst a plurality of signal sources, comprising:

at least one signal source input;

means, coupled to the at least one signal source input, for substantially simultaneously determining at least one test quality metric uniquely corresponding to at least one test signal source of the plurality of signal sources and at least one payload quality metric uniquely corresponding to a payload signal source of the plurality of signal sources, wherein test data and payload data are contained on a signal generated by the wireless communication device; and means, coupled to the means for determining, that selects a new payload signal source from the plurality of signal sources at least based upon the at least one test quality metric and the at least one payload quality metric.

45. The integrated circuit of claim 44, wherein the means for selecting selects the new payload signal source based at least upon a previous payload quality metric corresponding to the payload signal source comparing unfavorably with a threshold.

46. The integrated circuit of claim 44, wherein the means for selecting selects the new payload signal source at least based upon the at least one payload quality metric comparing unfavorably with a threshold.

47. The integrated circuit of claim 44, wherein the means for determining measures a jitter value during the reception of test data, and wherein the at least one test quality metric is based at least upon the jitter value.

48. The integrated circuit of claim 44, further comprising:

a signal strength input, coupled to the means for determining, wherein the at least one test quality metric is based at least upon a received signal strength value received via the signal strength input.

49. An integrated circuit for determining a quality metric for one of a plurality signal sources, comprising:

at least one signal source input;

means, coupled to the at least one signal source input, for calculating a first set of quality parameters for the one of the plurality of signal sources based on reception of test data;

means, coupled to the at least one signal source input, for calculating a second set of quality parameters for the one of the plurality of signal sources based on the reception of payload data, wherein the first set of quality parameters and the second set of quality parameters are not identical, and wherein the test data and the payload data are contained on a signal generated by the wireless communication device; and means, coupled to the means for calculating the first set of quality parameters and the means for calculating the second set of quality parameters, for determining the quality metric based on the first and second sets of quality parameters.

50. The integrated circuit of claim 49, wherein the first set of quality parameters comprises a jitter value measured during the reception of the test data.

51. The integrated circuit of claim 49, further comprising:

a signal strength input, coupled to the means for calculating the first set of quality parameters, wherein the first set of quality parameters comprises a received signal strength value measured during the reception of the test data and received via the signal strength input.

52. The integrated circuit of claim 49, wherein the second set of quality parameters comprises any of: a CRC error value calculated during the reception of the payload data and a synchronization error value calculated during the reception of the payload data.

53. An integrated circuit for use in evaluating a plurality of signal sources, comprising:

at least one signal source input;

means, coupled to the at least one signal source input, for evaluating each of the plurality of signal sources based upon reception of test data to provide a plurality of quality metrics; and means for selecting a payload signal source based on the plurality of quality metrics, wherein the means for evaluating updates a quality metric corresponding to the payload antenna based upon the reception of payload data to provide an updated quality metric, and wherein the test data and the payload data are contained on a signal generated by the wireless communication device.

54. The integrated circuit of claim 53, wherein the means for selecting selects the payload signal source based at least upon a previous quality metric corresponding to a previous payload signal source comparing unfavorably with a threshold.

55. The integrated circuit of claim 53, wherein the means for selecting selects the payload signal source at least based upon a quality metric of the plurality of quality metrics corresponding to a previous payload signal source comparing unfavorably with a threshold.

56. The integrated circuit of claim 53, wherein the means for selecting selects a new payload signal source based at least upon the updated quality metric.

57. The integrated circuit of claim 56, wherein the means for selecting selects the new payload signal source based at least upon the updated quality metric comparing unfavorably with a threshold.

* * * * *